United States Patent
Shiue

(10) Patent No.: US 9,421,734 B2
(45) Date of Patent: Aug. 23, 2016

(54) FABRIC STRUCTURE FOR MANUFACTURING WATER SPORTS GARMENTS

(71) Applicant: Shei Chung Hsin Ind. Co., Ltd., Yilan County (TW)

(72) Inventor: Heng-Wen Shiue, Yilan County (TW)

(73) Assignee: Shei Chung Hsin Ind. Co., Ltd., Yilan County (TW)

( * ) Notice: Subject to any disclaimer, the term of this patent is extended or adjusted under 35 U.S.C. 154(b) by 390 days.

(21) Appl. No.: 14/178,297

(22) Filed: Feb. 12, 2014

(65) Prior Publication Data

US 2015/0224741 A1 Aug. 13, 2015

(51) Int. Cl.

| | |
|---|---|
| *B32B 5/24* | (2006.01) |
| *B32B 5/26* | (2006.01) |
| *B32B 7/12* | (2006.01) |
| *B63C 11/04* | (2006.01) |
| *B32B 5/02* | (2006.01) |
| *B32B 25/04* | (2006.01) |
| *B32B 25/10* | (2006.01) |
| *B32B 3/12* | (2006.01) |

(52) U.S. Cl.
CPC ............. *B32B 5/245* (2013.01); *B32B 3/12* (2013.01); *B32B 5/026* (2013.01); *B32B 5/26* (2013.01); *B32B 7/12* (2013.01); *B32B 25/045* (2013.01); *B32B 25/10* (2013.01); *B63C 11/04* (2013.01); *B32B 2262/0261* (2013.01); *B32B 2262/0276* (2013.01); *B32B 2262/0284* (2013.01); *B32B 2266/0207* (2013.01); *B32B 2274/00* (2013.01); *B32B 2307/51* (2013.01); *B32B 2307/554* (2013.01); *B32B 2307/584* (2013.01); *B32B 2307/7265* (2013.01); *B32B 2307/73* (2013.01); *B32B 2437/00* (2013.01); *B63C 2011/043* (2013.01); *B63C 2011/046* (2013.01); *Y10T 428/24149* (2015.01); *Y10T 442/413* (2015.04)

(58) Field of Classification Search
CPC ......... B32B 5/026; B32B 5/24; B32B 5/245; B32B 5/26; B32B 7/12; B32B 25/045; B32B 25/10; B63C 11/04; B63C 2011/043; B63C 2011/046

See application file for complete search history.

(56) References Cited

U.S. PATENT DOCUMENTS

| | | | |
|---|---|---|---|
| 7,395,553 B2 | 7/2008 | O'Hara | |
| 7,743,428 B2 | 6/2010 | O'Hara | |
| 8,191,171 B2 | 6/2012 | O'Hara | |
| 2003/0129895 A1* | 7/2003 | Baychar | A41D 27/02 442/1 |
| 2007/0012397 A1* | 1/2007 | de Jong | A41D 31/0038 156/252 |
| 2011/0000003 A1* | 1/2011 | Shiue | B63C 11/04 2/2.15 |
| 2011/0173732 A1* | 7/2011 | Gordon | A41D 13/012 2/2.16 |
| 2013/0318672 A1* | 12/2013 | Gordon | A41D 13/012 2/2.15 |

* cited by examiner

*Primary Examiner* — Jenna Johnson
(74) *Attorney, Agent, or Firm* — CKC & Partners Co., Ltd.

(57) ABSTRACT

The present disclosure provides a fabric structure for manufacturing water sports garments. The foamed rubber sheet has a first surface and a second surface opposite to the first surface. The inner fabric layer includes a draining fabric layer attached to the first surface of the foamed rubber sheet, an elastic fabric layer attached to the draining fabric layer, and a water repellent fabric layer attached to the elastic fabric layer. The outer fabric layer is attached to the second surface of the foamed rubber sheet. Water may directly pass into the draining fabric layer, through the water repellent fabric layer and the elastic fabric layer, and be drained out of the fabric structure. Therefore, the user wearing the water sports garment made of the fabric structure may feel comfortable and warm while water is drained out.

15 Claims, 3 Drawing Sheets

FABRIC STRUCTURE FOR MANUFACTURING WATER SPORTS GARMENTS

BACKGROUND

1. Technical Field

The present disclosure relates to a fabric structure for manufacturing water sports garments, and more particularly, to a fast-drying fabric structure for manufacturing water sports garments.

2. Description of Related Art

Generally, a water sportsperson, e.g., swimmer, surfer, and diver, wears a garment to keep warm while water temperature is below a comfortable or safe level. A water sports garment is normally constructed from a multi-layer fabric structure with an outer layer and an inner layer.

The outer layer of the multi-layer fabric structure is made of a material with abrasion resistance, so as to protect the body of the water sportsperson in case of collision. The inner layer is made of a synthetic knit fabric providing additional thermal insulation for the water sportsperson. Further, the inner layer also retains water that enters the water sports garment.

However, the synthetic knit fabric made of synthetic materials generally has fair heat retention characteristics in wearing. Further, the inner layer of the general water sports garment, which is knitted to closely contact the water sportsperson's skin, is apt to trap the water entering the water sports garment, such that the water trapped in the water sports garment does not drain easily and extended the drying time of the water sports garment. Therefore, there is a need for an improved fabric structure for water sports to address the aforementioned problems met in the art.

SUMMARY

The present disclosure provides a fabric structure for water sports, to solve the problems met in the art, and more particularly, to have the better drying performance.

One embodiment of the present disclosure is to provide a fabric structure for manufacturing water sports garments. The fabric structure includes a foamed rubber sheet, an inner fabric layer and an outer fabric layer.

The foamed rubber sheet has a first surface and a second surface opposite to the first surface. The inner fabric layer is attached to the first surface of the foamed rubber sheet, and includes a draining fabric layer, an elastic fabric layer and a water repellent fabric layer. The draining fabric layer is attached to the first surface of the foamed rubber sheet. The elastic fabric layer is attached to the draining fabric layer. The water repellent fabric layer is attached to the elastic fabric layer. The outer fabric layer is attached to the second surface of the foamed rubber sheet.

According to one embodiment of the present disclosure, the draining fabric layer includes polyamide.

According to one embodiment of the present disclosure, the thickness of the drain fabric layer is in a range of 0.4-0.7 mm.

According to one embodiment of the present disclosure, the vertical and horizontal elasticity of the elastic fabric layer is in a range of 50%-250%.

According to one embodiment of the present disclosure, the thickness of the elastic fabric layer is in a range of 0.1-0.3 mm.

According to one embodiment of the present disclosure, the material of the water repellent fabric layer is made of a hydrophobic fiber.

According to one embodiment of the present disclosure, the material of the hydrophobic fiber includes polyester, polyethylene terephthalate (PET), polycarbonate (PC) or a combination thereof.

According to one embodiment of the present disclosure, the water repellent fabric layer further comprises a jacquard knit surface.

According to one embodiment of the present disclosure, the jacquard knit surface is in a geometrical pattern.

According to one embodiment of the present disclosure, the geometrical pattern includes a honeycomb shape.

According to one embodiment of the present disclosure, the water repellent fabric layer further comprises a fleece layer on the jacquard knit surface.

According to one embodiment of the present disclosure, the fabric structure further comprises a fleece layer formed on the water repellent fabric layer.

According to one embodiment of the present disclosure, the thickness of the water repellent fabric layer is in a range of 1.5-2.0 mm.

According to one embodiment of the present disclosure, the inner fabric layer is attached to the first surface of the foamed rubber sheet by a first adhesive layer.

According to one embodiment of the present disclosure, the outer fabric layer is attached to the second surface of the foamed rubber sheet by a second adhesive layer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
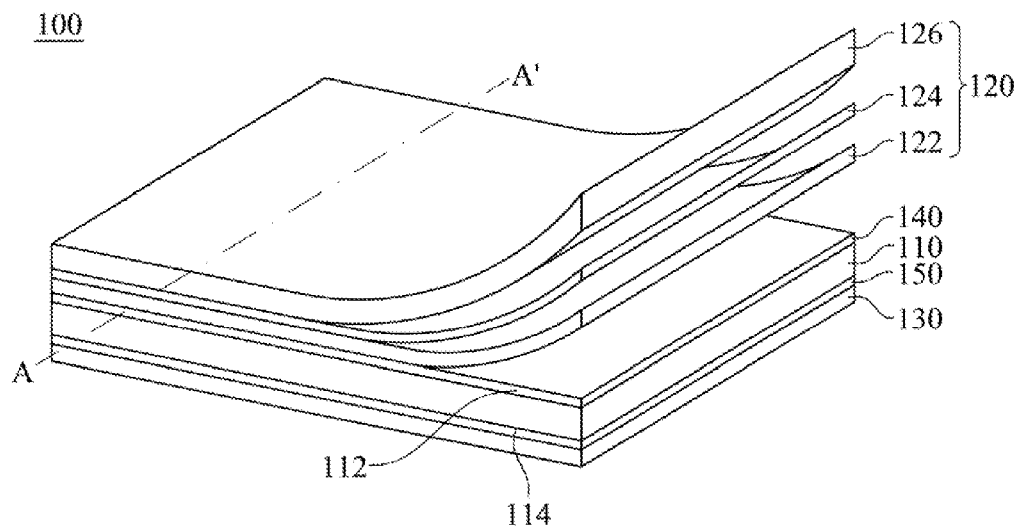
FIG. 1 is a perspective and schematic split view of a fabric structure according to various embodiments of the present disclosure.

The embodiments of the transparent conductive structure and a method for manufacturing the same of the present disclosure are discussed in detail below, but not limited the scope of the present disclosure. The same symbols or numbers are used to the same or similar portion in the drawings or the description. And the applications of the present disclosure are not limited by the following embodiments and examples which the person in the art can apply in the related field.

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

In the general water sports garment, the water trapped in the inner layer does not drain easily, so that the general water sports garment performs poor drying performance and poor heat retention characteristics. Thus, the user who wears the general water sports garment may feel uncomfortable or cold. For solving the met problem in the art, the present disclosure provides a fast-drying fabric structure for manufacturing water sports garments.

FIG. 1 is a perspective and schematic split view of a fabric structure 100 according to various embodiments of the present disclosure. In FIG. 1, the fabric structure 100 includes a foamed rubber sheet 110, an inner fabric layer and an outer fabric layer 130.

The foamed rubber sheet 110 has a first surface 112 and a second surface 114 opposite to the first surface 112. According to one embodiment of the present disclosure, the material of the foamed rubber sheet 110 includes Neoprene and the likes.

The inner fabric layer 120 is attached to the first surface 112 of the foamed rubber sheet 110. According to one embodiment of the present disclosure, a first adhesive layer 140 is sandwiched between the inner fabric layer 120 and the foamed rubber sheet 110, so that the inner fabric layer 120 may be fastened on the first surface 112 of the foamed rubber sheet 110.

The inner fabric layer 120 includes a draining fabric layer 122, an elastic fabric layer 124 and a water repellent fabric layer 126. The draining fabric layer 122 is attached to the first surface 112 of the foamed rubber sheet 110. According to one embodiment of the present disclosure, the draining fabric layer is knitted by polyamide fibers such as Nylon or the likes. According to one embodiment of the present disclosure, the thickness of the drain fabric layer is in a range of 0.4-0.7 mm.

The elastic fabric layer 124 is attached to the draining fabric layer 122. In various embodiments of the present disclosure, the elastic fabric layer 124 is knitted by an elastic fabric (elastane) such as Spandex, Lycra, Tactel or the likes. According to one embodiment of the present disclosure, the vertical and horizontal elasticity of the elastic fabric layer is in a range of 50%-250%. According to one embodiment of the present disclosure, the thickness of the elastic fabric layer is in a range of 0.1-0.3 mm.

The water repellent fabric layer 126 is attached to the elastic fabric layer 124. When an user (not shown) wears a water sports garment (not shown) made of the fabric structure 100, the water repellent fabric layer 126 may be adjacent or in contact with the user's skin (not shown). In various embodiments of the present disclosure, the water repellent fabric layer 126 is made of a hydrophobic fiber including polyester, polyethylene terephthalate (PET), polycarbonate (PC) or a combination thereof. According to one embodiment of the present disclosure, the thickness of the water repellent fabric layer is in a range of 1.5-2.0 mm. According to one embodiment of the present disclosure, the water repellent fabric layer 126 further comprises a fleece layer (not shown). The fleece layer may increase the thickness of the water repellent fabric layer, so as to provide better heat retention characteristics.

The outer fabric layer 130 is attached to the second surface 114 of the foamed rubber sheet 110. When an user wears the water sports garment made of the fabric structure 100, the outer fabric layer 130 may be directly exposed to water. The outer fabric layer 130 is constructed from a material with abrasion resistance, so that the water sports garment protects the user's body when collision occurred. According to one embodiment of the present disclosure, a second adhesive layer 150 is sandwiched between the outer fabric layer 130 and the foamed rubber sheet 110, so that the outer fabric layer 130 may be fastened on the second surface 114 of the foamed rubber sheet 110.

Figure 2:
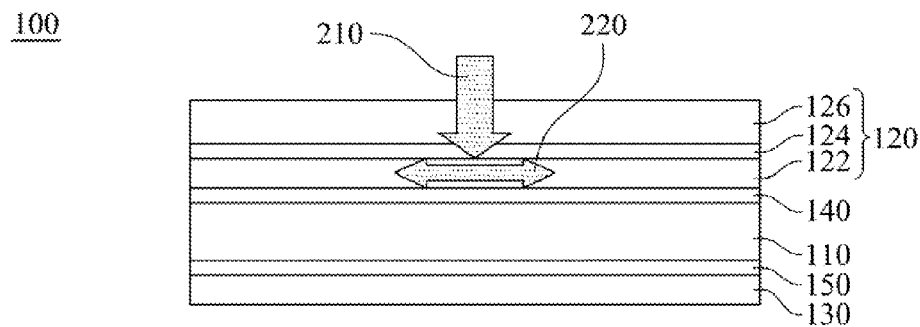
FIG. 2 is a schematic cross-sectional view of the fabric structure taken along A-A' line as shown in FIG. 1.

FIG. 2 is a schematic cross-sectional view of the fabric structure taken along A-A' line as shown in FIG. 1. In FIG. 2, due to the water repellency of the water repellent fabric layer 126, water 210 may directly enter into the inner fabric layer 120, but not be left in the water repellent fabric layer 126 or between the water repellent fabric layer 126 and the user's skin. Then, the water 210 may pass into the draining fabric layer 122, through the elastic fabric layer 124.

After entering the draining fabric layer 122, water 220 may flow in the draining fabric layer 122 and drained out of the fabric structure 100. Therefore, the user wearing the water sports garment made of the fabric structure 100 may feel comfortable and warm while water is drained out.

Figure 3:
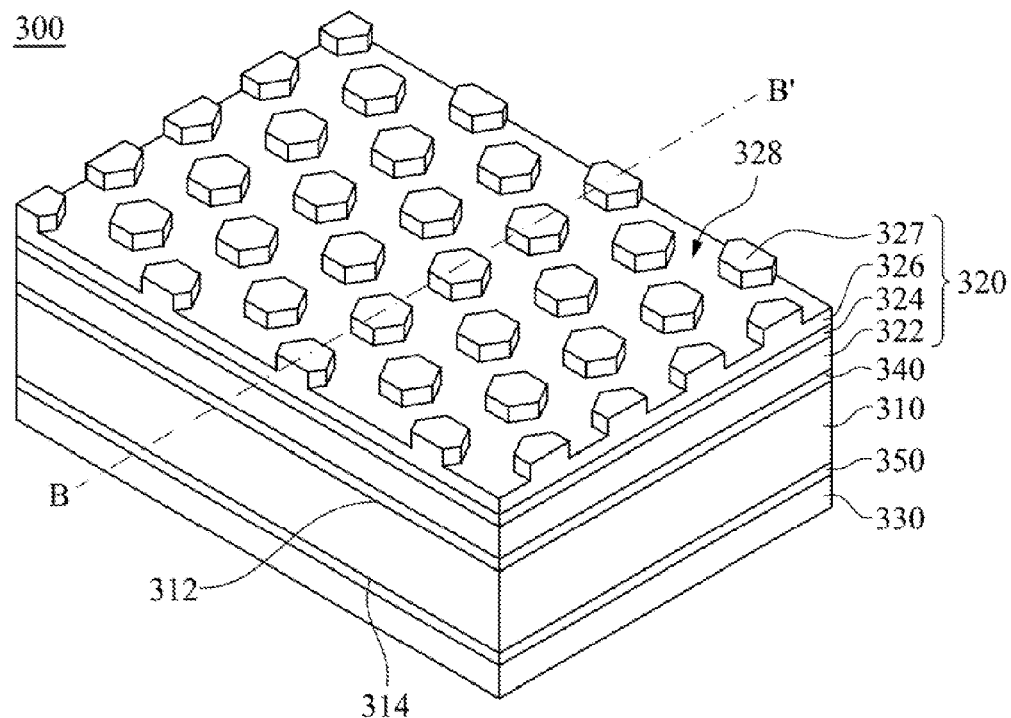
FIG. 3 is a three-dimensional view of a fabric structure according to various embodiments of the present disclosure.

FIG. 3 is a three-dimensional view of a fabric structure according to various embodiments of the present disclosure. In FIG. 3, the fabric structure includes a foamed rubber sheet 310, an inner fabric layer 320 and an outer fabric layer 330.

The foamed rubber sheet 310 has a first surface 312 and a second surface 314 opposite to the first surface 312. According to one embodiment of the present disclosure, the material of the foamed rubber sheet 310 includes Neoprene and the likes.

The inner fabric layer 320 is attached to the first surface 312 of the foamed rubber sheet 310. According to one embodiment of the present disclosure, a first adhesive layer 340 is sandwiched between the inner fabric layer 320 and the foamed rubber sheet 310, so that the inner fabric layer 320 may be fastened on the first surface 312 of the foamed rubber sheet 310.

The inner fabric layer 320 includes a draining fabric layer 322, an elastic fabric layer 324 and a water repellent fabric layer 326. The draining fabric layer 322 is attached to the first surface 312 of the foamed rubber sheet 310. According to one embodiment of the present disclosure, the draining fabric layer is knitted by polyamide fibers such as Nylon or the likes. According to one embodiment of the present disclosure, the thickness of the drain fabric layer is in a range of 0.4-0.7 mm.

The elastic fabric layer 324 is attached to the draining fabric layer 322. In various embodiments of the present disclosure, the elastic fabric layer 324 is knitted by an elastic fabric (elastane) such as Spandex, Lycra, Tactel or the likes. According to one embodiment of the present disclosure, the vertical and horizontal elasticity of the elastic fabric layer is in a range of 50%-250%. According to one embodiment of the present disclosure, the thickness of the elastic fabric layer is in a range of 0.1-0.3 mm.

The water repellent fabric layer 326 is attached to the elastic fabric layer 324. When an user (not shown) wears a water sports garment (not shown) made of the fabric structure 300, the water repellent fabric layer 326 may be adjacent or in contact with the user's skin (not shown). In various embodiments of the present disclosure, the water repellent fabric layer 326 is made of a hydrophobic fiber including polyester, polyethylene terephthalate (PET), polycarbonate (PC) or a combination thereof. According to one embodiment of the present disclosure, the thickness of the water repellent fabric layer is in a range of 1.5-2.0 mm.

Different from the fabric structure shown 100 in FIG. 1, the water repellent fabric layer 326 in FIG. 3 has a jacquard knit surface 327. In FIG. 3, the jacquard knit surface 327 includes a plurality of channels 328. According to one embodiment of the present disclosure, the jacquard knit surface is in a geometrical pattern such as a honeycomb shape or the likes.

The outer fabric layer 330 is attached to the second surface 314 of the foamed rubber sheet 310. When an user wears the water sports garment made of the fabric structure 300, the outer fabric layer 330 may be directly exposed to water. The outer fabric layer 330 is constructed from a material with abrasion resistance, so that the water sports garment protects the user's body when collision occurred. According to one embodiment of the present disclosure, a second adhesive layer 350 is sandwiched between the outer fabric layer 330 and the foamed rubber sheet 310, so that the outer fabric layer 330 may be fastened on the second surface 314 of the foamed rubber sheet 310.

Figure 4:
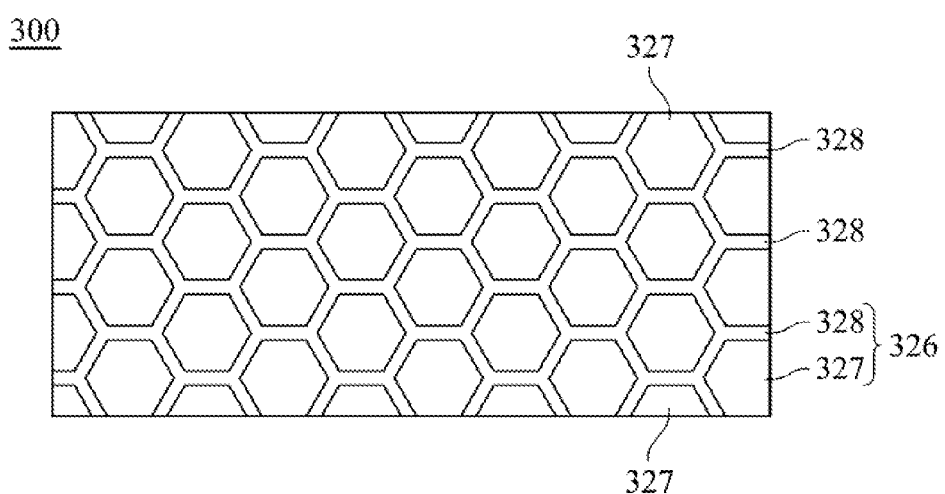
FIG. 4 is a top view of the fabric structure as shown in FIG. 3.

FIG. 4 is a top view of the fabric structure as shown in FIG. 3. In FIG. 4, the repellent fabric layer 326 has a jacquard knit surface 327 including a plurality of channels 328.

Figure 5:
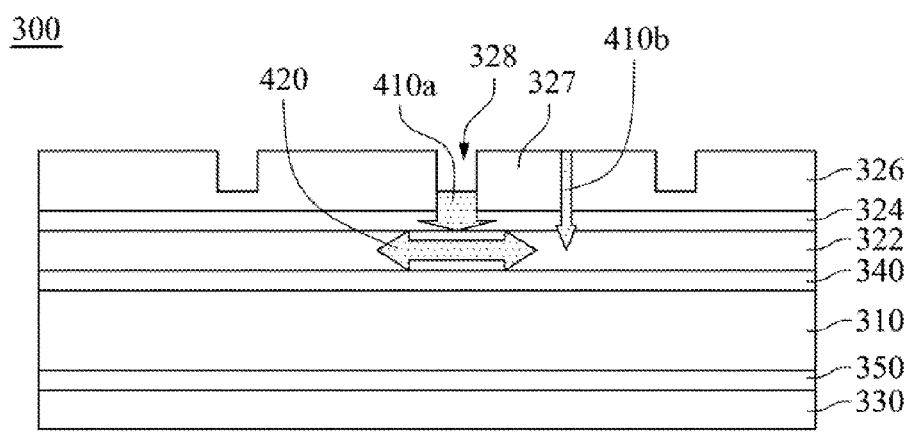
FIG. 5 is a schematic cross-sectional view of the fabric structure taken along B-B' line as shown in FIG. 3.

FIG. 5 is a schematic cross-sectional view of the fabric structure taken along B-B' line as shown in FIG. 3. In FIG. 3, due to the water repellency of the water repellent fabric layer 326, water 410a and 410b may directly enter into the inner fabric layer 320, but not be left in the water repellent fabric layer 326 or between the water repellent fabric layer 326 and the user's skin. Then, the water 410a and 410b may pass into the draining fabric layer 322, through the elastic fabric layer 324.

After entering the draining fabric layer 322, water 420 may flow in the draining fabric layer 322 and drained out of the fabric structure 300. Therefore, the user wearing the water sports garment made of the fabric structure 300 may feel comfortable and warm while water is drained out.

Different from the fabric structure shown 100 in FIG. 2, the water repellent fabric layer 326 in FIG. 4 has a jacquard knit surface 327. In FIG. 4, the jacquard knit surface 327 includes a plurality of channels 328. Because the water repellent fabric layer 326 at the channels 328 has a thinner thickness, the passing rate of water 410a may be faster than the water 410b while the water 410a and the water 410b enter into the water repellent fabric layer 326. As a result, the jacquard knit surface 327 on the water repellent fabric layer 326 may increase the drying performance of the fabric structure 300.

Figure 6:
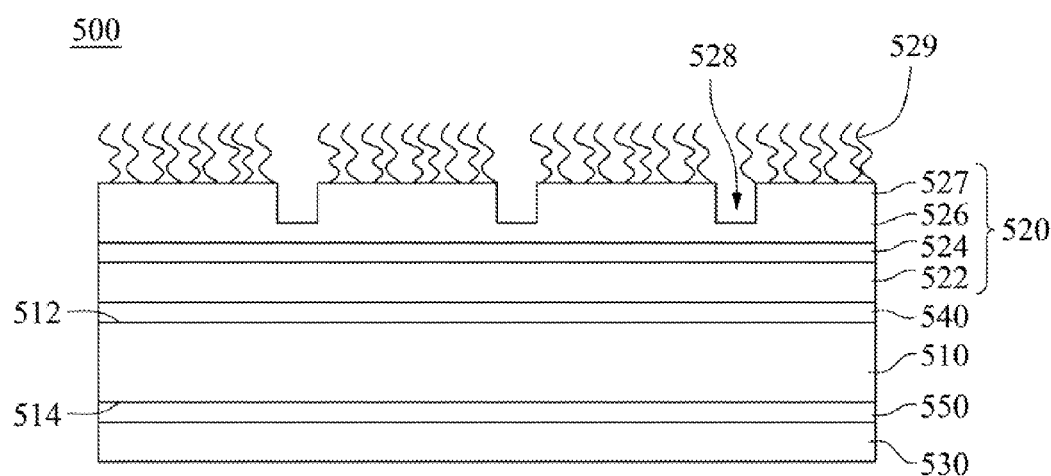
FIG. 6 is a schematic cross-sectional view of a fabric structure according to various embodiments of the present disclosure.

FIG. 6 is a schematic cross-sectional view of a fabric structure according to various embodiments of the present disclosure. In FIG. 6, the fabric structure 500 includes a foamed rubber sheet 510, an inner fabric layer 520 and an outer fabric layer 530.

The foamed rubber sheet 510 has a first surface 512 and a second surface 514 opposite to the first surface 512. According to one embodiment of the present disclosure, the material of the foamed rubber sheet 510 includes Neoprene and the likes.

The inner fabric layer 520 is attached to the first surface 512 of the foamed rubber sheet 510. According to one embodiment of the present disclosure, a first adhesive layer 540 is sandwiched between the inner fabric layer 520 and the foamed rubber sheet 510, so that the inner fabric layer 520 may be fastened on the first surface 512 of the foamed rubber sheet 510.

The inner fabric layer 520 includes a draining fabric layer 522, an elastic fabric layer 524 and a water repellent fabric layer 526. The draining fabric layer 522 is attached to the first surface 512 of the foamed rubber sheet 510. According to one embodiment of the present disclosure, the draining fabric layer 522 is knitted by polyamide fibers such as Nylon or the likes. According to one embodiment of the present disclosure, the thickness of the drain fabric layer is in a range of 0.4-0.7 mm.

The elastic fabric layer 524 is attached to the draining fabric layer 522. In various embodiments of the present disclosure, the elastic fabric layer 524 is knitted by an elastic fabric (or elastane) such as Spandex, Lycra, Tactel or the likes. According to one embodiment of the present disclosure, the vertical and horizontal elasticity of the elastic fabric layer is in a range of 50%-250%. According to one embodiment of the present disclosure, the thickness of the elastic fabric layer is in a range of 0.1-0.3 mm.

The water repellent fabric layer 526 is attached to the elastic fabric layer 524. When an user (not shown) wears a water sports garment (not shown) made of the fabric structure 500, the water repellent fabric layer 526 may be adjacent or in contact with the user's skin (not shown). The water repellent fabric layer 526 has a jacquard knit surface 527, and the jacquard knit surface 527 includes a plurality of channels 528. According to one embodiment of the present disclosure, the jacquard knit surface is in a geometrical pattern such as a honeycomb shape or the likes. In various embodiments of the present disclosure, the water repellent fabric layer 526 is made of a hydrophobic fiber including polyester, polyethylene terephthalate (PET), polycarbonate (PC) or a combination thereof. According to one embodiment of the present disclosure, the thickness of the water repellent fabric layer is in a range of 1.5-2.0 mm.

Different from the fabric structure shown 300 in FIG. 5, a fleece layer 529 is formed on the jacquard knit surface 527, as shown in FIG. 6. The fleece layer 529 increases the thickness of the water repellent fabric layer 526, so as to provide better heat retention characteristics. Therefore, the user wearing the water sports garment made of the fabric structure 500 may feel warm.

The outer fabric layer 530 is attached to the second surface 514 of the foamed rubber sheet 510. When an user wears the water sports garment made of the fabric structure 500, the outer fabric layer 530 may be directly exposed to water. The outer fabric layer 530 is constructed from a material with abrasion resistance, so that the water sports garment protects the user's body when collision occurred. According to one embodiment of the present disclosure, a second adhesive layer 550 is sandwiched between the outer fabric layer 530 and the foamed rubber sheet 510, so that the outer fabric layer 530 may be fastened on the second surface 514 of the foamed rubber sheet 510.

In accordance with some embodiments, the present disclosure discloses the fabric structure for manufacturing water sports garments. The fabric structure includes the foamed rubber sheet, the inner fabric layer and the outer fabric layer. The inner fabric layer includes the draining fabric layer attached to the first surface of the foamed rubber sheet, the elastic fabric layer attached to the draining fabric layer, and the water repellent fabric layer attached to the elastic fabric layer.

Water may directly pass into the draining fabric layer, through the water repellent fabric layer and the elastic fabric layer, but not be left in the water repellent fabric layer or between the water repellent fabric layer and the user's skin. After entering the draining fabric layer, water may flow in the draining fabric layer and drained out of the fabric structure. Therefore, the user wearing the water sports garment made of the fabric structure may feel comfortable and warm while water is drained out.

In various embodiments of the present disclosure, the water repellent fabric layer further have the jacquard knit surface including the channels. Because the water repellent fabric layer at the channels has the thinner thickness, the water may faster enter into the draining fabric layer. As a result, the jacquard knit surface on the water repellent fabric layer may increase the drying performance of the fabric structure.

In various embodiments of the present disclosure, the fleece layer is further formed on the jacquard knit surface. The fleece layer increases the thickness of the water repellent fabric layer, so as to provide better heat retention characteristics. Therefore, the user wearing the water sports garment made of the fabric structure may feel warm.

Although embodiments of the present disclosure and their advantages have been described in detail, they are not used to limit the present disclosure. It should be understood that various changes, substitutions and alterations can be made herein without departing from the spirit and scope of the present disclosure. Therefore, the protecting scope of the present disclosure should be defined as the following claims.

What is claimed is:

1. A fabric structure for manufacturing water sports garments, comprising:
   a foamed rubber sheet having a first surface and a second surface opposite to the first surface;
   an inner fabric layer attached to the first surface of the foamed rubber sheet, comprising:
      a draining fabric layer attached to the first surface of the foamed rubber sheet;
      an elastic fabric layer attached to the draining fabric layer; and
      a water repellent fabric layer attached to the elastic fabric layer; and
   an outer fabric layer attached to the second surface of the foamed rubber sheet.

2. The fabric structure of claim 1, wherein the draining fabric layer includes polyamide.

3. The fabric structure of claim 1, wherein the thickness of the draining fabric layer is in a range of 0.4-0.7 mm.

4. The fabric structure of claim 1, wherein the vertical and horizontal elasticity of the elastic fabric layer is in a range of 50%-250%.

5. The fabric structure cloth of claim 1, wherein the thickness of the elastic fabric layer is in a range of 0.1-0.3 mm.

6. The fabric structure of claim 1, wherein the material of the water repellent fabric layer is made of a hydrophobic fiber.

7. The fabric structure of claim 2, wherein the material of the hydrophobic fiber includes polyester, polycarbonate (PC) or a combination thereof.

8. The fabric structure of claim 1, wherein the water repellent fabric layer further comprises a jacquard knit surface.

9. The fabric structure of claim 8, wherein the jacquard knit surface is in a geometrical pattern.

10. The fabric structure of claim 9, wherein the geometrical pattern includes a honeycomb shape.

11. The fabric structure of claim 8, wherein the water repellent fabric layer further comprises a fleece layer on the jacquard knit surface.

12. The fabric structure of claim 1, further comprising a fleece layer formed on the water repellent fabric layer.

13. The fabric structure of claim 1, wherein the thickness of the water repellent fabric layer is in a range of 1.5-2.0 mm.

14. The fabric structure of claim 1, wherein the inner fabric layer is attached to the first surface of the foamed rubber sheet by a first adhesive layer.

15. The fabric structure of claim 1, wherein the outer fabric layer is attached to the second surface of the foamed rubber sheet by a second adhesive layer.

* * * * *